(12) United States Patent
Park et al.

(10) Patent No.: US 6,560,179 B2
(45) Date of Patent: May 6, 2003

(54) RECORDING AND REPRODUCING APPARATUS HAVING COPY-PROTECTION FUNCTION AND METHOD THEREOF

(75) Inventors: Sang On Park, Kyounggi-do (KR); Yong Hee Han, Kyounggi-do (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 09/832,121

(22) Filed: Apr. 11, 2001

(65) Prior Publication Data

US 2002/0021635 A1 Feb. 21, 2002

(30) Foreign Application Priority Data

Apr. 11, 2000 (KR) .......................................... 2000-19019

(51) Int. Cl.[7] .................................................. G11B 7/00
(52) U.S. Cl. .................................. 369/53.21; 369/47.12; 369/84
(58) Field of Search ............................ 369/47.1, 47.12, 369/47.13, 53.1, 83, 84, 85, 59.1, 53.21

(56) References Cited

U.S. PATENT DOCUMENTS 6,070,799 A * 6/2000 Ashe ........................... 369/84
6,289,102 B1 * 9/2001 Ueda et al. ................. 380/201

* cited by examiner

*Primary Examiner*—Muhammad Edun
(74) *Attorney, Agent, or Firm*—Birch, Stewart, Kolasch & Birch, LLP

(57) ABSTRACT

A method for protecting disc copy of the present invention includes the steps of detecting an identifier of a disc to be reproduced and determining if a disc copy is permitted or not using copy protection disc information and the identifier. A recording and reproducing apparatus having a disc copy-protection function of the present invention includes a reproducing drive for reading data from a disc, a recording drive for writing data on other disc, storage unit for storing a copy-protection disc information for judging whether a disc copy is permitted or not, and control unit for controlling a disc copy from the disc in the reproducing drive to the other disc in the recording drive.

23 Claims, 3 Drawing Sheets

RECORDING AND REPRODUCING APPARATUS HAVING COPY-PROTECTION FUNCTION AND METHOD THEREOF

BACKGROUND OF THE INVENTION (a) Field of the Invention

The present invention relates to a recording and reproducing apparatus for optical discs, and in particular, to a recording and reproducing apparatus having a copy-protection function and a method thereof.

(b) Description of the Related Art

Since its commercial introduction in 1982, the audio compact disc (CD) has almost completely replaced the phonograph disc for high-fidelity recorded music, and the distribution of the portable CD player has made it possible to listen to music while moving.

Recently, a recording and reproducing apparatus capable of writing information signals from a disc and writing the same thereon is widespread such that it becomes easy for users to copy commercial discs.

An audio CD is provided with a lead-in region on a radial inner side of a data region in which audio signals are recorded. In the lead-in region, the data information is recorded on the CD such as a time code showing a starting position of each of tracks in the data region, track number of the first and last tracks on the disc and a time code showing the end position of the last track.

However, since there is no information for identifying whether the disc is original one or illegally copied one, it is impossible to prevent the commercial audio CD from being illegally copied.

SUMMARY OF THE INVENTION

The present invention has been made in an effort to solve the above problems of the prior art.

It is an object of the present invention to provide a method capable of protecting illegal copy by identifying a disc using the information encrypted on the disc.

It is another object of the present invention to provide a method and apparatus capable of protecting illegal copy by creating unique identification information using the track number and address detected from the lea-in region.

It is another object of the present invention to provide a method and apparatus capable of authentication of a user while coping a disc by identifying a copy history of the disc using the disc identification information stored in memory during a previous copy operation and the information on the disc presently inserted into a drive.

It is another object of the present invention to provide a method and apparatus capable of permitting, inhibiting, or limiting copy of a disc using writing speed information as well as the identification information of the disc.

It is still another object of the present invention to provide a method and apparatus capable of permitting, inhibiting, or limiting copy of a disc using number of tracks as well as the identification information of the disc.

To achieve the above object, a method for protecting disc copy of the present invention comprises the steps of detecting an identifier of a disc to be reproduced, and determining if a disc copy is permitted or not using copy-protection disc information and the identifier. A recording and reproducing apparatus having a disc copy-protection of the present invention comprises a reproducing drive for reading data from a disc, a recording drive for writing data on other disc, storage means for storing a copy-protection disc information for judging whether a disc copy is permitted or not, and control means for controlling a disc copy from the disc in the reproducing drive to the other disc in the recording drive.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A copy-protection method for a disc recording/reproducing apparatus of the present invention comprises the steps of identifying ID information of a disc to be read and determining if the disc is permitted to be copied or not using copy-protection information and the ID information of the disc.

A method for creating a copy-protection information of the present invention comprises the steps of detecting track information from a disc and creating a copy-protection information as an identifier for permitting copy and storing the copy-protection information.

A recording/reproducing apparatus having a copy-protection function of the present invention comprises a reproducing drive for reading data from a disc, a recording drive for writing data on the disc, a memory for storing copy-protection information for determining if permitting the disc to be copied or not, a control means for transferring data from the reproducing drive to the recording drive.

If a copy operation is permitted, the copy-protection information to the copied disc is created and stored in the memory.

In cases where the copy operation is finished by a permission, number of tracks is greater than a threshold number, or recording speed is greater than a threshold value, the copy-protection information is created and stored in the memory.

The copy-protection information comprises only a disc identifier or at least one of the recording speed information and copied data information as well as the disc identifier.

The disc identifier can comprises track numbers and addresses, and copy permission is determined according to the identifier and data information such as the recording speed and number of tracks.

According to the recording/reproducing apparatus having the copy-protection function of the present invention, an identifier is created using the data information of the disc inserted into the drive and the disc can be identified by the identifier using software algorithm.

Accordingly, it is possible to protect the illegal copy of discs by identifying copy history of the disc using the identifier and the copy permission is determined according to the identifier.

A preferred embodiment of the present invention will be described hereinafter with reference to the accompanying drawings.

Figure 1:
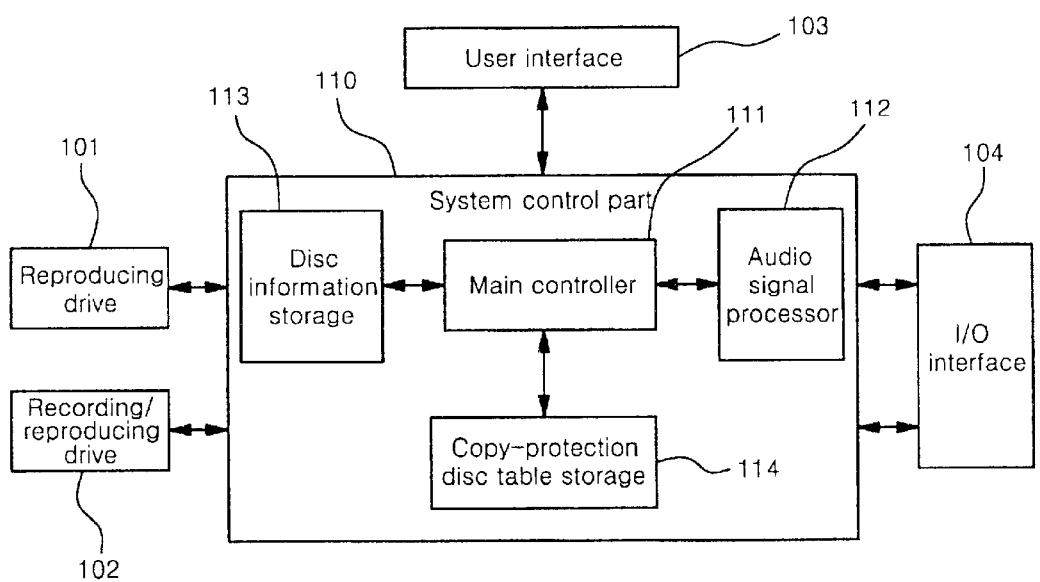
FIG. 1 is a block diagram illustrating a recording/reproducing apparatus having a copy-protection function according to a preferred embodiment of the present invention.

FIG. 1 is a block diagram illustrating a recording/reproducing apparatus having a copy-protection function according to a preferred embodiment of the present invention.

The recording/reproducing apparatus having the copy-protection function of the present invention comprises a reproducing drive 101 for receiving a disc and reading data from the disc, a recording/reproducing drive 102 for receiving a disc and recording data on the disc or reproducing data from the disc, a user interface 103 for inputting user commands, an I/O interface 104 for inputting and outputting analog and digital audio signals therethrough, and a system control part 110 for controlling the reproducing and recording/reproducing drives 101 and 102 and the I/O interface 104 according to the user commands input from the user interface 103.

The system control part 110 comprises a main controller 111 for executing commands from the user interface 103, an audio signal processor 112 for communicating audio signals with the I/O interface 104 and processing the signals, a disc information storage 113 for storing data information on the discs inserted into the reproducing drive 101 and the recording/reproducing drive 102, and a copy-protected disc table storage 114 for storing list of the discs to be copy-limited.

Figure 2:
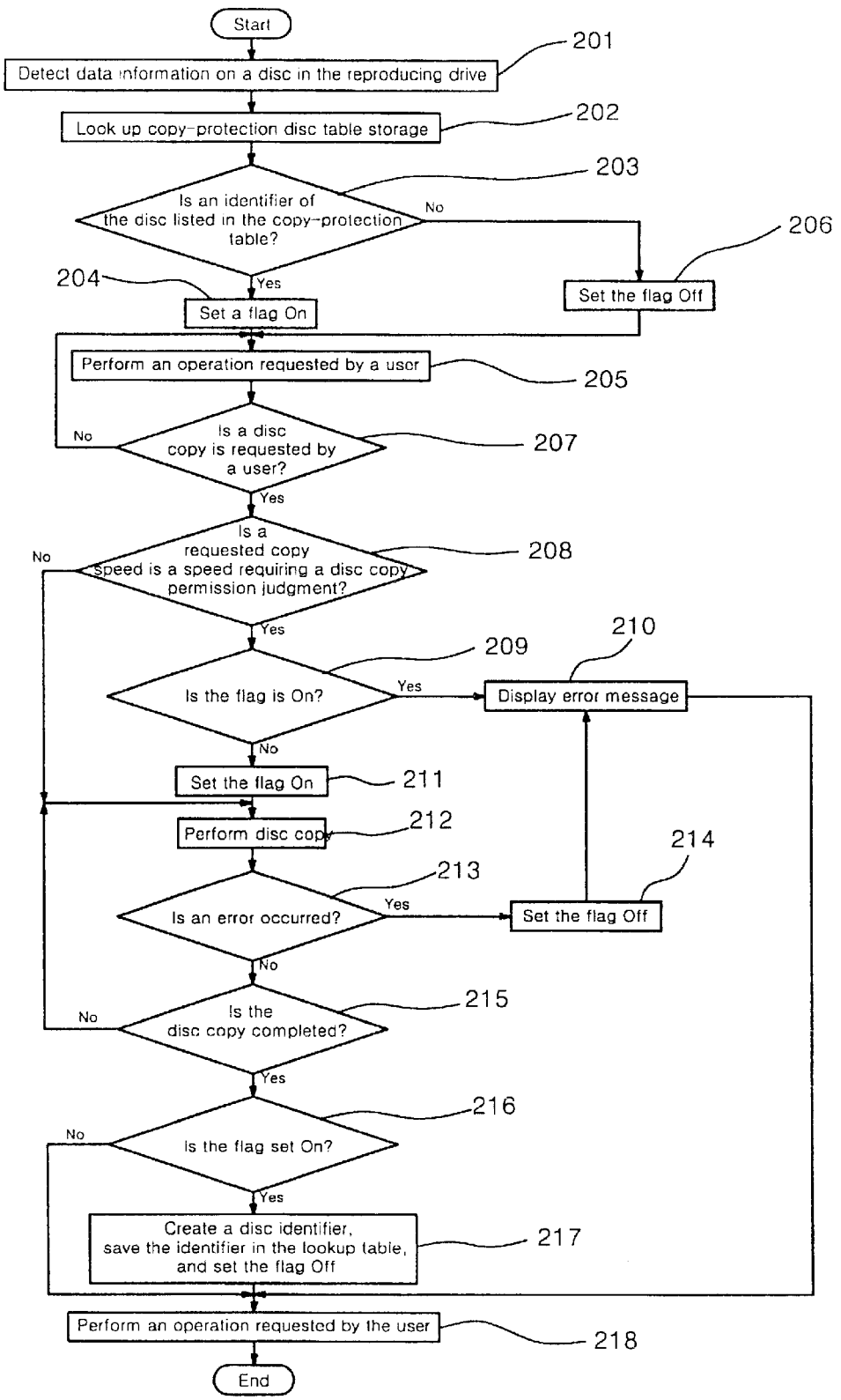
FIG. 2 is a flowchart illustrating a copy-protection method for the recording/reproducing apparatus of FIG. 1.

FIG. 2 is a flowchart illustrating a copy-protection method for the above structured recording/reproducing apparatus.

Once a disc is put on the reproducing drive 101, the reproducing drive 101 detects data information in the lead-in region of the disc and store the data information in the disc information storage 113 so as to obtain information such as number of tracks, track numbers, length of each track and track addresses at step 201.

Consequently, the main controller 111 looks up a copy-protected disc table stored in the copy-protected disc table storage 114 so as to obtain track information and track addresses of each of the listed discs in the table at step 202.

Next, the main controller 111 compares the track information and address of each track of the disc in the reproducing drive 101 and the track information and address of each track of the listed discs in the lookup table at step 203. That is, the main controller 111 looks up the lookup table in the storage 114 for searching an identifier of the disc in the reproducing drive 101.

If the identifier of the disc inserted in the reproducing drive 101 is listed in the lookup table, the main controller 111 sets a flag as 1 at step 204 and then performs a requested operation at step 205.

The fact that the identifier is listed in the lookup table of the storage 114 means that the disc has been copied at least once.

The copy-protected disc storage 114 can be a nonvolatile memory such as an erasable programmable read only memory (EPROM) such that the copy history information can be stored therein during a predetermined period according to a first-in-first-out algorithm regardless to the power state. By identifying the copy history information, it is possible to protect illegal copy.

In the case when a volatile memory such as a random access memory (RAM) is used as the copy-protected disc storage 114, it is need to reset the power for repeatedly copying data from the disc in the reproducing drive 101 such that this frustrates an intention of illegal mass copy.

If the identifier of the disc in the reproducing drive 10 is not listed in the lookup table of the copy-protected disc storage 114 at step 203, the main controller 111 sets the flag as 0 at step 206 and then performs a normally requested operation at step 205.

Consequently, the main controller 111 determines whether a disc copy is requested by a user or not at step 207. If the disc copy is requested, the main controller 111 of the system control part 110 determines if the requested disc copy speed is a speed requiring disc copy permission judgment at step 208. In this case, the disc copy permission speed can be set by a manufacturer of the recording/reproducing apparatus.

If the requested disc copy speed is a speed requiring disc copy permission judgment, the main controller 111 looks up the flag at step 209. If the flag is set as 1, the main controller 111 displays an error message indicating that the disc copy is not permitted at step 210 and then performs a requested operation.

If the flag is set 0 at step 209, the main controller 111 resets the flag as 1 at step 211 and then starts copying the disc in the reproducing drive 101 at step 212.

If the requested disc copy speed is a speed not requiring judgment of disc copy permission, the main controller 111 immediately starts disc copy at step 212.

Once the disc copy is permitted, the main controller 111 starts copying of the disc in the reproducing drive 101 and monitors the copy operation for checking errors at step 213, if an error occurs during the copy procedure, the main controller 111 resets the flag as 0 at step 214, and then displays an error message and waits for another request.

The main controller 111 determines if the disc copy is completed in the case no error occurs during the copy procedure at step 215. If the disc copy is not completed at step 215, the program goes back to the step 212 and performs the following procedures again and if the disc copy is completed, the main controller 111 identifies the flag at step 216.

If the flag is set as 1, the main controller 111 creates an identifier of the disc in the reproducing drive 101 and adds the identifier of the disc in the lookup table of the copy-protected disc table storage 114 and then resets the flag as 0 at step 217. Consequently, the main controller 111 performs a requested operation at step 218.

The identifier of the disc can be created and stored according to the number of tracks. That is, in performing the disc copy according to the user's request, the identifier of the disc in the reproducing drive is created and added in the lookup table of the copy-protected disc table storage 114 if the copied data is larger than those of preset tracks.

If the flag is set as 0 at step 216, the main controller stops coping the disc and performs a requested operation at step 218.

The identifier storing in the lookup table of the copy-protected disc table storage 114 comprises the track numbers and the address information of each track detected from the disc inserted into the reproducing drive 101.

Figure 3:
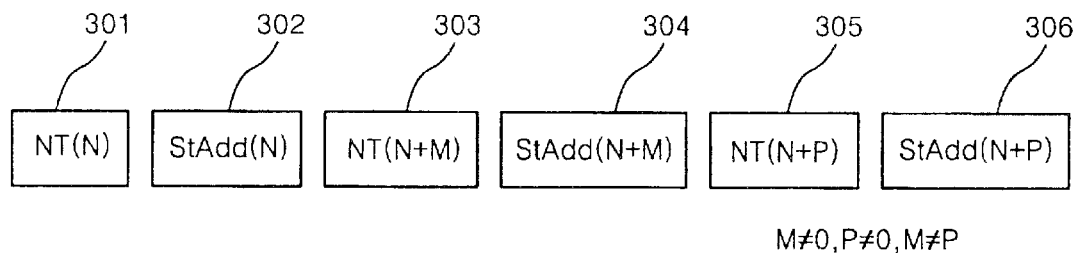
FIG. 3 is a schematic view illustrating a storing structure of copy-protection information of the copy-protection method of FIG. 2.

FIG. 3 is a schematic view illustrating a storing structure of copy-protection information of the copy-protection method of the present invention.

The identifier stored in the lookup table of the copy-protected disc table storage 114 comprises an Nth track number (NT(N)) 301, a starting address (StAdd(N)) 302 of Nth track, an N+M(M≈0)th track number (NT(N+M)) 303, a starting address (StAdd(N+M)) 304 of (N+M)th track, an N+P(P≈M, P≈0)th track number (NT(N+P)) 305, and a starting address (StAdd(N+P)) 306 of (N+P)th track.

The identifier further has a copy speed information recorded together with the identification information of FIG. 3 such that it is possible to manage a copy history on the copy speed and control permission of disc copy according to the copy speed.

A method for creating an identifier to be stored in the lookup table of the copy-protected disc table storage 114 can variously create the identifier by selecting track in random processing method or selecting a fixed track among all the tracks and using the track number of the selected track and a starting address of each track.

Figure 4:
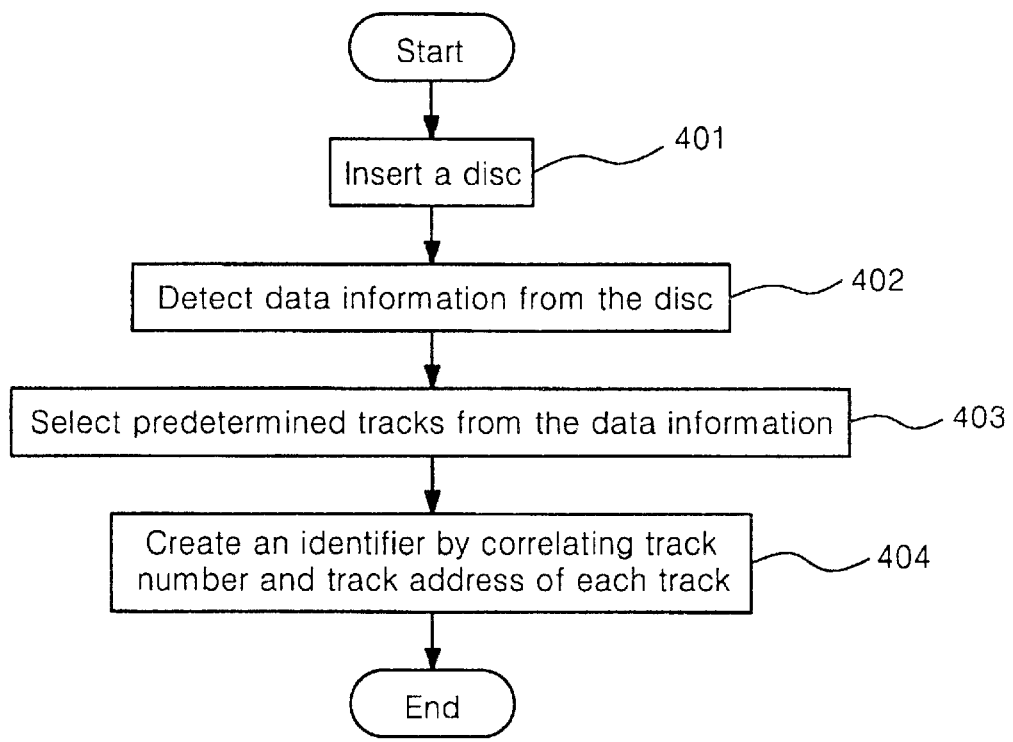
FIG. 4 is a flowchart illustrating a method for creating copy-protection information of the present invention.

The method for creating the identifier will be described with reference to FIG. 4 hereinafter. FIG. 4 is a flowchart illustrating a method for creating copy-protection information of the present invention.

Once a disc 101 is inserted into a reproducing drive at step 401, the main controller 111 of the system control part 110 gathers data information and then stores the information in the disc information storage 113 of the system control part 110 at step 402.

The main controller 111 selects at least one or more tracks using information of number of tracks and the address information of each of the tracks at step 403. The main controller 111 creates a unique identifier capable of distinguishing the disc from other discs by correlating the selected track numbers and address information of each of the selected tracks at step 404.

For example, the identifier of the disc comprises an Nth track number (NT(N)) 301, a starting address (StAdd(N)) 302 of Nth track, an N+M(M≈0)th track number (NT(N+M)) 303, a starting address (StAdd(N+M)) 304 of (N+M)th track, an N+P(P≈M, P≈0)th track number (NT(N+P)) 305, and a starting address (StAdd(N+P)) 306 of (N+P)th track as shown in FIG. 3.

By giving an identifier to the disc inserted into the reproducing drive and identify the disc using the identifier, it is possible to distinguish the disc from other discs.

As described above, the recording/reproducing apparatus having a copy-protection function and method thereof according to the resent invention creates an identifier using track numbers and addresses detected from the lead-in region of the disc and comparing the identifier to other identifiers listed in a lookup table so as to permit, limit, or inhibit the disc copy according to a preset algorithm.

Accordingly, it is possible to protect illegal copy of the disc, or permit limited copy of the disc using a preset algorithm such that the user can partially copy the disc and easily make a private disc.

What is claimed is:

1. A method for protecting disc copy comprising the steps of:
    detecting an identifier of a disc to be reproduced; and
    determining whether a disc copy is permitted based on the identifier being listed in copy-protection disc information.

2. A method of claim 1 wherein the copy protection disc information comprises only the disc identifier or one of copy speed information and track information as well as the identifier.

3. A method of claim 1 wherein the identifier is track information stored in the disc.

4. A method of claim 1 wherein the identifier comprises track numbers and addresses stored in the disc.

5. A method of claim 1 wherein the identifier comprises an Nth track number (NT(N)), a starting address (StAdd(N)) of Nth track, an N+M(M 0)th track number (NT(N+M)), a starting address (StAdd(N+M)) of (N+M)th track, an N+P(P M, P 0)th track number (NT(N+P)), and a starting address (StAdd(N+P)) of (N+P)th track.

6. A method of claim 1 wherein the disc copy permission is determined according to a copy speed as well as the identifier.

7. A method of claim 1 wherein the disc copy permission id determined according to track information as well as the identifier.

8. A method of claim 7 wherein the track information is track numbers or number of tracks.

9. A method of claim 1 wherein a copy-protection disc information is created and stored if the disc copy is permitted.

10. A method of claim 9 wherein the copy-protection disc information comprises an identifier or one of copy speed information and track information as well as the identifier.

11. A method of claim 10 wherein the track information is track numbers or number of tracks.

12. A method of claim 9 wherein the copy-protection disc information is created and stored in case when the copy is completed, number of tracks is greater than a predetermined threshold value, or a copy speed is faster than a predetermined threshold speed.

13. A method for creating copy-protection disc information comprising the steps of:
    detecting track information from a disc; and
    creating and saving a unique identifier based on the detected track information of the disc for distinguishing the disc from other discs; and
    determining whether a disc copy is permitted based on the identifier being listed in copy-protection disc information.

14. A method of claim 13 wherein the identifier comprises track numbers and track addresses.

15. A method of claim 14 wherein the identifier comprises an Nth track number (NT(N)), a starting address (StAdd(N)) of Nth track, an N+M(M 0)th track number (NT(N+M)), a starting address (StAdd(N+M)) of (N+M)th track, an N+P(P M, P 0)th track number (NT(N+P)), and a starting address (StAdd(N+P)) of (N+P)th track.

16. A recording/reproducing apparatus having a disc copy-protection function comprising:
    a reproducing drive for reading data from a disc, the data including an identifier of the disc;
    a recording drive for writing data on another disc;
    storage means for storing copy-protection disc information; and
    control means for controlling a disc copy from the disc in the reproducing drive to the other disc in the recording drive based on whether the identifier is listed in the copy-protection disc information.

17. A recording/reproducing apparatus of claim 16 wherein the copy-protection disc information comprises track numbers and track addresses read from the disc in the reproducing drive.

18. A recording/reproducing apparatus of claim 17 wherein the copy-protection disc information comprises an Nth track number (NT(N)), a starting address (StAdd(N)) of Nth track, an N+M(M 0)th track number (NT(N+M)), a starting address (StAdd(N+M)) of (N+M)th track, an N+P(P M, P 0)th track number (NT(N+P)), and a starting address (StAdd(N+P)) of (N+P)th track.

19. A recording/reproducing apparatus of claim 16 wherein the copy-protection disc information further comprises copy speed information or number of copied tracks.

20. A recording/reproducing apparatus of claim 16 wherein the storage means is a nonvolatile memory or a volatile memory.

21. A method for protecting disc copy comprising the steps of:

detecting an identifier of a disc to be reproduced; and determining if a disc copy is permitted or not using copy protection disc information and the identifier, wherein the identifier comprises an Nth track number (NT(N)), a starting address (StAdd(N)) of Nth track, an N+M(M≈0)th track number (NT(N+M)), a starting address (StAdd(N+M)) of (N+M)th track, an N+P (P≈M, P≈0)th track number (NT(N+P)), and a starting address (StAdd(N+P)) of (N+P)th track.

22. A method for creating copy-protection disc information comprising the steps of:

detecting track information from a disc; and creating and saving a unique identifier of the disc for distinguishing the disc from other discs, wherein the identifier comprises track numbers and track addresses, and the track information comprises an Nth track number (NT(N)), a starting address (StAdd(N)) of Nth track, an N+M(M≈0)th track number (NT(N+M)), a starting address (StAdd(N+M)) of (N+M)th track, an N+P(P≈M, P≈0)th track number (NT(N+P)), and a starting address (StAdd(N+P)) of (N+P)th track.

23. A recording/reproducing apparatus having a disc copy-protection function comprising:

a reproducing drive for reading data from a disc;

a recording drive for writing data on other disc;

storage means for storing a copy-protection disc information for judging whether a disc copy is permitted or not; and control means for controlling a disc copy from the disc in the reproducing drive to the other disc in the recording drive, wherein the copy-protection disc information comprises track numbers and track addresses read from the disc in the reproducing drive, and the copy-protection disc information comprises an Nth track number (NT(N)), a starting address (StAdd(N)) of Nth track, an N+M (M≈0)th track number (NT(N+M)), a starting address (StAdd(N+M)) of (N+M)th track, an N+P(P≈M, P≈0)th track number (NT(N+P)), and a starting address (StAdd (N+P)) of (N+P)th track.

* * * * *